Patented Mar. 2, 1926.

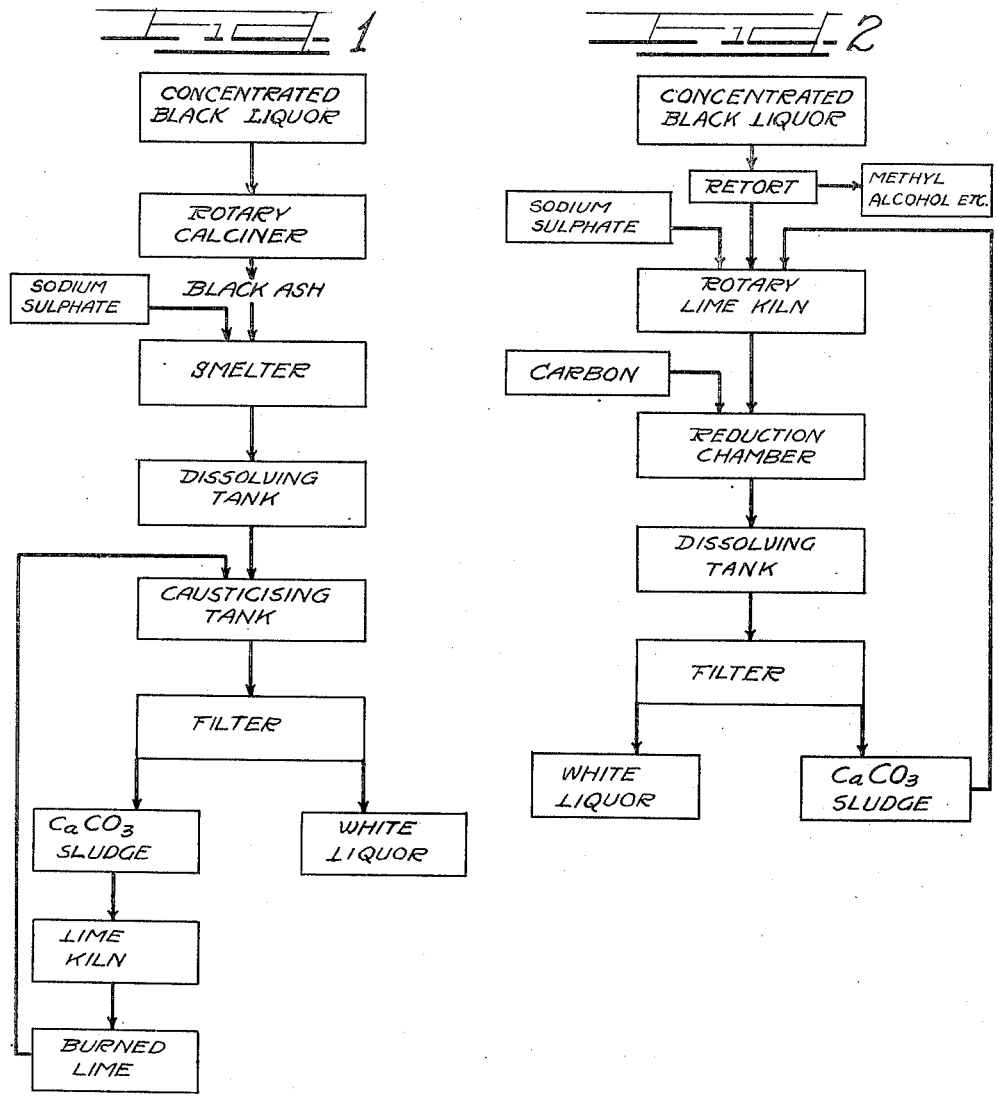

1,575,473

UNITED STATES PATENT OFFICE.

ALFRED H. WHITE, OF ANN ARBOR, MICHIGAN, ASSIGNOR TO JOHN E. ALEXANDER, OF PORT EDWARDS, WISCONSIN, AND E. G. GOODELL, OF STEVENS POINT, WISCONSIN, TRUSTEES.

REGENERATION PROCESS FOR BLACK LIQUOR.

Application filed December 26, 1924, Serial No. 758,147. Renewed November 6, 1925.

*To all whom it may concern:*

Be it known that I, ALFRED H. WHITE, a citizen of the United States, and a resident of the city of Ann Arbor, in the county of Washtenaw and State of Michigan, have invented certain new and useful Improvements in a Regeneration Process for Black Liquor, and I hereby declare that the following is a full, clear, and exact description of the same, reference being had to the accompanying drawings, and to the numbers of reference marked thereon, which form a part of this specification.

This invention relates to the regeneration of "black liquor" used in the sulphate process of paper pulp manufacture.

According to this process the pulp is treated with a mixture of sodium hydroxide and sodium sulphide, the so-called "white liquor" to dissovle the lignin and other constituents of the wood and release the cellulose fibres.

The liquor after dissolving the lignin called "black liquor" consists of sodium salts of organic acids, such as acetic, etc., some sodium carbonate, sulphate and unchanged hydroxide and sulphide. The alkaline material in the black liquor is recovered by first eliminating the organic matter, then converting the sodium sulphate into sulphide by reduction with carbonaceous material and finally causticizing the sodium carbonate by means of lime.

In practice as now commonly carried out the dilute black liquors are concentrated in vacuum evaporators or by waste heat to a thick syrup which is burned in a rotary furnace to give a mixture of sodium carbonate, sulphate and sulphide with solid carbon known as "black ash". This black ash is mixed with additional sodium sulphate to make up losses and is thrown into a smelter, which is provided with an air blast at the bottom. The combustion of the carbon in the black ash, and any additional fuel which may be added, gives strong reducing conditions and a temperature high enough to melt the sodium salts which flow from the bottom of the smelter as a mixture consisting mainly of sodium carbonate and sodium sulphide. This molten stream of fused salts falls into a tank of water where the salts are dissolved. The solution is pumped to the causticizing tank where milk of lime is added to convert the sodium carbonate into caustic soda with the precipitation of calcium carbonate. The clear solution separated from the sludge is known as "white liquor" and is put back into the digester with a fresh charge of wood. The calcium carbonate sludge is either thrown away or reburned to lime and put back in the causticizing tank.

The principal objects of the present invention are to improve, simplify and cheapen the regeneration of such "black liquors".

Other and further important objects of the invention will be apparent from the disclosure in the following description which sets forth the preferred form of my invention.

In the drawings:

Figure 1 is the flow sheet of the regeneration process as ordinarily carried out.

Figure 2 is the flow sheet of my improved process.

In my co-pending application Serial No. 744,410, filed October 18, 1924, it was pointed out that whereas sodium sulphate was ordinarily not reduced by carbon at a temperature below 950° C. it could be easily reduced to sulphide at 600° to 700° C. in the presence of an oxide, such as lime, capable of combining with carbon dioxide at such temperature.

If the lime be added after the calcination to form black ash it will be evident that two heat treatments are involved—first the calcination of the calcium carbonate to form lime and then the heating of the lime so formed to 700° C. along with the sodium sulphate etc.

According to the present invention only one heat treatment may be employed. The calcium carbonate may be mixed with the black liquor and furnaced in an oxidizing atmosphere to form lime. The atmosphere must be oxidizing or otherwise the following reaction will take place—

$Na_2SO_4 + CaCO_3 + 2C = Na_2CO_3 + CaS + 2CO_2$ 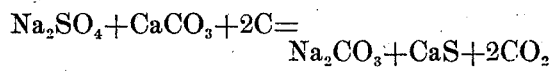

After the lime has been formed the temperature is allowed to drop to 600° to 700° C. and then subjected to reducing conditions. At this temperature sodium sulphide and calcium carbonate are formed with substantially no interaction between these compounds to form sodium carbonate and calcium sulphide. The reaction which takes place is as follows:

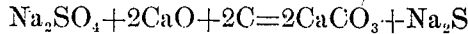
$$Na_2SO_4 + 2CaO + 2C = 2CaCO_3 + Na_2S$$

The amount of calcium carbonate added is preferably sufficient to form not only enough lime to absorb the carbon dioxide formed by the reduction of the sodium sulphate according to the above equation but also to causticize the sodium carbonate when water is added to the product.

In the process commonly used there is a partial destructive distillation of the liquor in the rotary furnace and among the gases formed are mercaptans which have an extremely disagreeable odor and create a nuisance in the neighborhood of the mill. These mercaptans are, however, readily oxidized so that with oxodizing conditions at all times prior to complete carbonization the production of mercaptans is largely avoided.

Preferably as indicated in the flow-sheet the black liquor is preferably destructively distilled, and the methyl alcohol, acetone, etc., collected, prior to raising the temperature to decompose the calcium carbonate. For this purpose the method and apparatus described in my prior Patent No. 1,197,983 may be employed to advantage.

The operation of the customary smelter is expensive because of the high temperature involved and the corrosive action of the fused salts on the lining of the smelter. While sodium sulphate fuses at 884°C. and sodium carbonate at 852°C. the entire mass in this new process is not ordinarily fluid at around 1000°, the temperature at which the calcium carbonate is decomposed to form lime, owing to the large content of infusible oxide or carbonate of lime.

The mixture of lime and sodium salts will leave the lime kiln at a temperature above 900° C. and may drop at once to a reduction chamber which consists simply of a steel shell, lined with brick or other heat insulating material and capable of being sealed to prevent access of air to the contents. A simple form of equipment would consist of two of these reduction chambers for each lime kiln, each capable of holding about four hours output of the kiln. As the burned lime drops into this reduction chamber, carbon, in the form of crushed coal or other carbonaceous material and sufficient in amount to reduce the sulphate to sulphide will be added from time to time. When the reduction chamber is full, the stream of burned lime will be transferred to the second reduction chamber, and the first chamber will be sealed and allowed to stand for two hours. The sensible heat in the lime leaving the kiln at above 900° will be sufficient to maintain this reduction chamber at a desirable temperature for the reduction say about 700° C., and at the end of two hours, the reduction chamber may be opened and the product removed to the leaching tank. Here, any unchanged CaO will hydrate, the soluble salts, principally $Na_2S$, $Na_2SO_3$, and $Na_2CO_3$, will dissolve and there will be reaction between the sodium carbonate and calcium hydroxide to form calcium carbonate and sodium hydroxide. The liquid will then go to a filter. The calcium carbonate sludge will be returned to the lime kiln and the white liquor will go to the digester room.

I am aware that numerous details of the process may be varied through a wide range without departing from the spirit of this invention, and I do not desire limiting the patent granted otherwise than as necessitated by the prior art.

I claim as my invention:

1. The process of regenerating black liquors from the sulphate pulp process which includes heating black ash and calcium carbonate in an oxidizing atmosphere to a temperature sufficient to decompose the calcium carbonate, and then treating the mass at a lower temperature in the presence of carbonaceous material to reduce the sodium sulphate to sodium sulphide.

2. The process of regenerating black liquors from the sulphate pulp process which includes calcining the spent black liquors in the presence of calcium carbonate to a resultant product consisting mainly of calcium oxide, sodium carbonate and sodium sulphate, causing this calcined product to react with carbonaceous material at a temperature above 300° C. and below 900° C. until the sulphate is reduced and leaching this reduced material with water to recover the soluble sodium salts.

3. The process of regenerating black liquors from the sulphate pulp process which includes subjecting the concentrated black liquor to destructive distillation, calcining the resultant solid residue together with calcium carbonate to form a mixture of calcium oxide, sodium carbonate and sodium sulphate causing this calcined residue to react with carbonaceous material at a temperature above 300° C. but below 900° C. in the absence of air until the sulphate is reduced and leaching to recover the soluble sodium salts.

In testimony whereof I have hereunto subscribed my name.

ALFRED H. WHITE.